July 19, 1938.　　　A. J. SCHOLTES　　　2,124,153
FLASHLIGHT
Filed Nov. 12, 1936　　　3 Sheets-Sheet 1
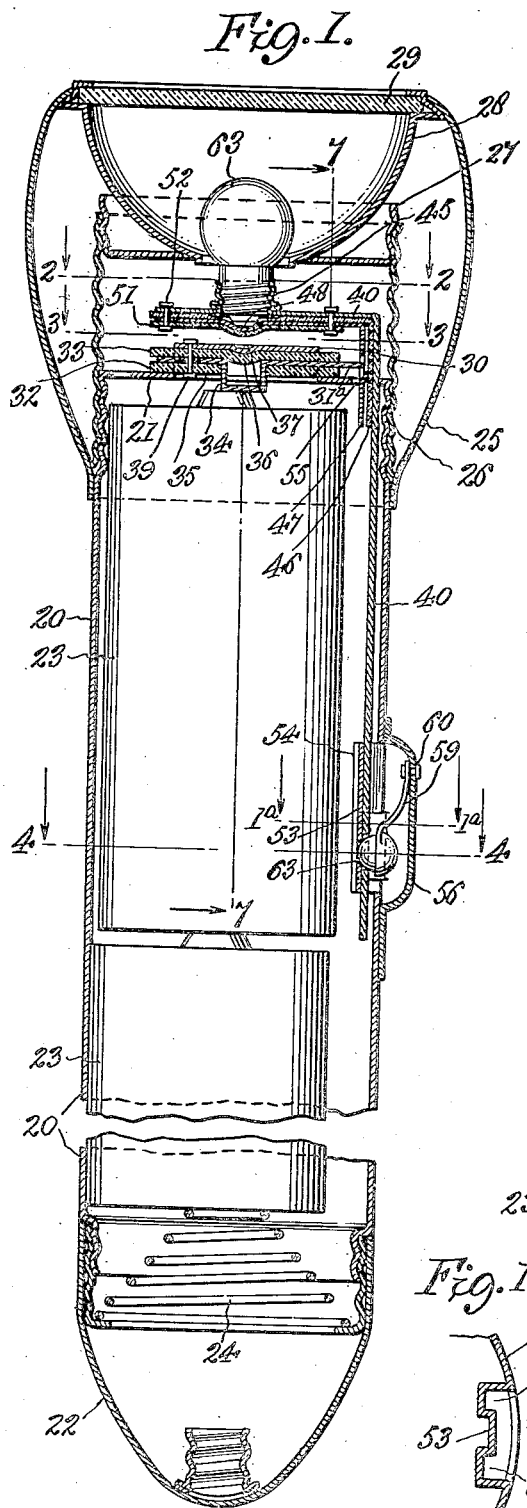
Fig.1.
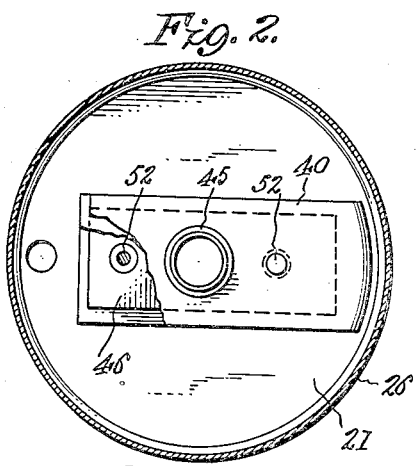
Fig.2.
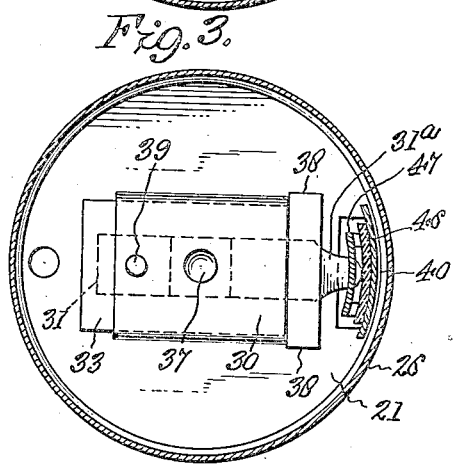
Fig.3.
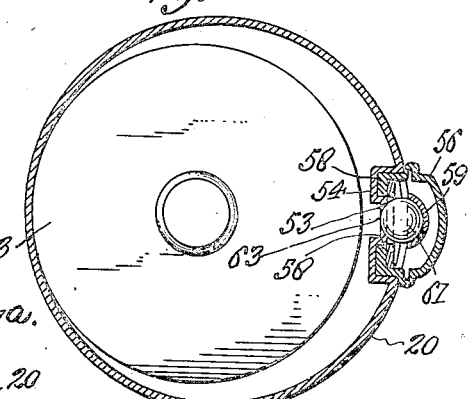
Fig.4.
Fig.7a.
Inventor
Albert J. Scholtes
By Mawhinney & Mawhinney
Attorneys July 19, 1938.  A. J. SCHOLTES  2,124,153
FLASHLIGHT
Filed Nov. 12, 1936   3 Sheets-Sheet 2
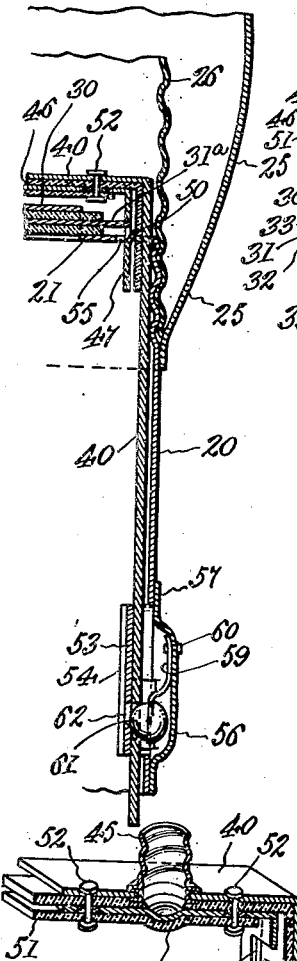
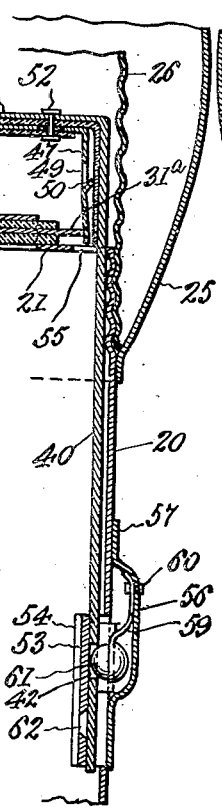
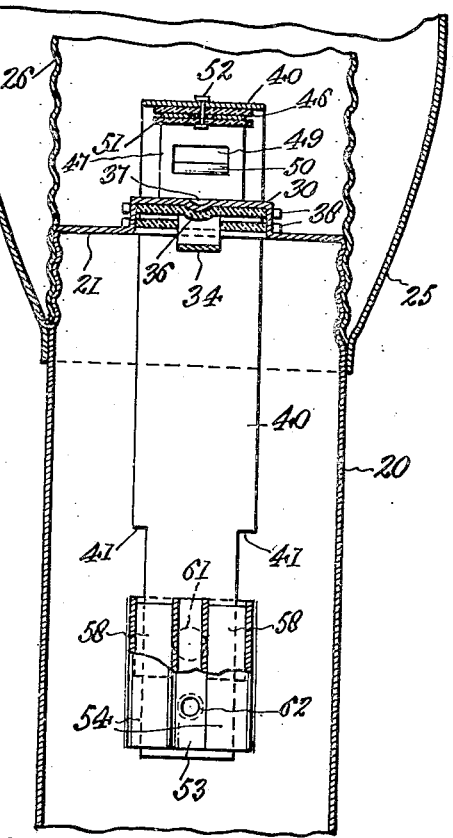
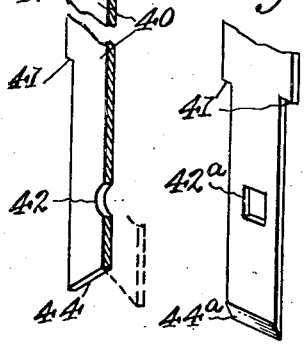
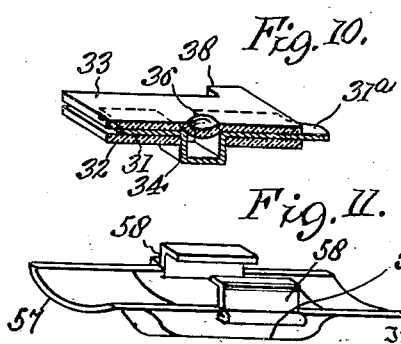
Inventor
Albert J. Scholtes
By Mawhinney & Mawhinney
Attorneys July 19, 1938.  A. J. SCHOLTES  2,124,153
FLASHLIGHT
Filed Nov. 12, 1936  3 Sheets-Sheet 3
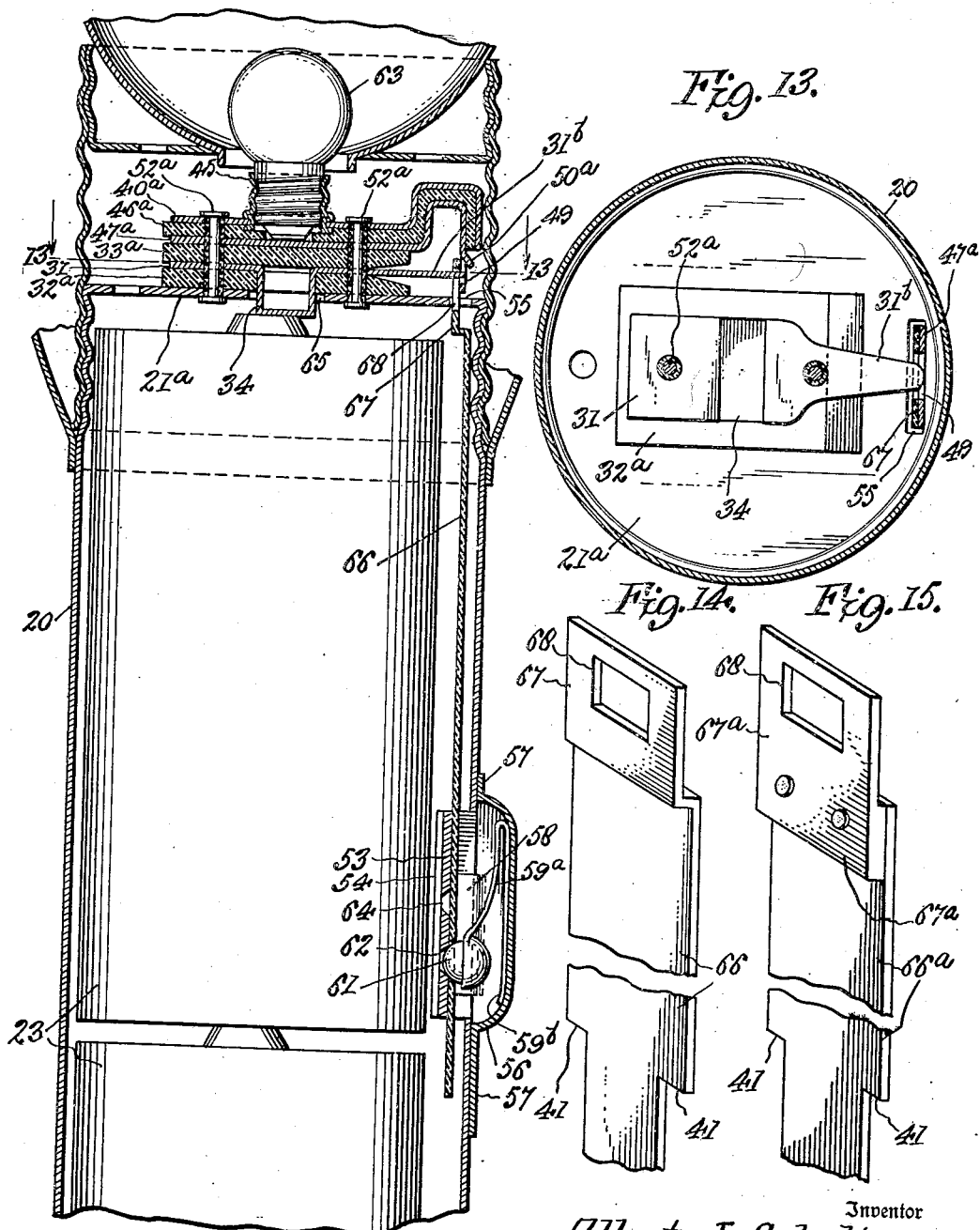
Inventor
Albert J. Scholtes
By Mawhinney & Mawhinney
Attorneys Patented July 19, 1938

2,124,153

UNITED STATES PATENT OFFICE 2,124,153

FLASHLIGHT

Albert J. Scholtes, Baltimore, Md.

Application November 12, 1936, Serial No. 110,513

16 Claims. (Cl. 240—10.66)

The present invention relates to flash lights, and has for an object to simplify and improve the various structural parts and their assembling into a flash light structure.

Another object of the invention is to provide a flash light having the parts or units thereof so constructed and interfitted that they may be readily separated for repair, substitution, cleaning and adjustment.

A further object of the invention is to provide a single control element for operation by a single finger or thumb to effect the flashing of the light, the setting of the light for a steady beam and the focusing of the light, and which at the same time is characterized by the above set forth features of easy assemblage and separability of its parts.

The invention also aims to provide a flash light composed of a plurality of units which may be easily and economically assembled into a composite structure, and which may be permanently secured together to prevent separation as may be desired under certain conditions of use and handling.

The invention also provides a flash light with a circuit closer adjacent the lamp and an operating element remote from the circuit closer and which is housed in the side of the casing and has a portion of the casing wall therebetween and the battery or batteries of the flash light.

Another object of the invention is to provide a flash light structure wherein the circuit closing takes place outside of the casing in the head shell adjacent the lamp and prevents the corrosion of the battery coming into contact with the circuit making and breaking parts which short circuits, destroys and otherwise impairs the same, as is so common in present day flash light structures.

With the foregoing and other objects in view, the invention will be more fully described hereinafter, and will be more particularly pointed out in the claims appended hereto.

In the drawings, wherein like symbols refer to like or corresponding parts throughout the several views.

Figure 1 is a longitudinal central section taken through a flash light embodying features of the present invention, and with the parts in neutral circuit open position.

Figure 1ª is a fragmentary sectional view taken on the line 1ª—1ª of Figure 1, showing the depressed housing portion with other elements removed, in the side of the body casing or shell of the flash light.

Figure 2 is a transverse section taken on the line 2—2 of Figure 1 through the upper end of the flash light, parts being broken away to show insulation.

Figure 3 is a transverse section taken on the line 3—3 of Figure 1 below the showing in Figure 2, showing the fixed conductor mounting on the end wall of the casing.

Figure 4 is a transverse section taken on the line 4—4 of Figure 1 through the intermediate portion of the casing, showing the control means for operating the flash light.

Figure 5 is a fragmentary longitudinal section taken from Figure 1, showing the circuit closer and the remote operating means therefor in flash position.

Figure 6 is a similar view, but showing the parts in a different focus adjustment position and with the circuit closer in continuously closed position.

Figure 7 is a fragmentary longitudinal section taken on the line 7—7 of Figure 1 axially at right-angles thereto, and with the parts in the adjustment of Figure 6.

Figure 8 is a detail perspective view in section of the slide member with the lamp socket thereon.

Figure 9 is a fragmentary perspective view of the lower end of the slide member, showing a modification thereof for accommodating a roller for use in place of the ball of Figure 1.

Figure 9ª is a fragmentary free end view of the pressure spring, showing a slight modification adapting the spring to a roller for use in the structure of Figure 9.

Figure 10 is a detail perspective view in section ready for mounting on the upper end wall of the flash light casing.

Figure 11 is a detail inverted perspective view of the central shell or thumb piece for slidable mounting against the side of the casing.

Figure 12 is a fragmentary longitudinal section taken through a flash light, showing a modification in the circuit closer and control device therefor.

Figure 13 is a transverse section taken on the line 13—13 of Figure 12 through the upper end of the modified form of the flash light.

Figure 14 is a detail perspective, partly broken away, of the slide member used in the modified form of Figure 12.

Figure 15 is a like view, showing a slightly modified form of the slide member of Figure 14.

Referring now to the drawings, and first to Figures 1 to 11, 20 designates the body shell or casing having an upper end wall 21 and provided with a closure cap 22 at its lower end. One or more batteries 23 are adapted to be placed in the casing 20 as shown in Figure 1 and are supported by a spring 24 which may be suitably mounted in the cap 22. A head 25 of shell form has a threaded sleeve 26 secured within its inner end and adapted for threaded engagement over the outer end of the body shell 20. A cupped ring 27 is threaded into the upper end of the sleeve 26 and bears against a reflector 28 mounted in the outer end of the head shell 25, the latter also carrying a suitable lens 29 extending across the reflector 28.

The closure cap 22 and the head shell 25 may be of any suitable construction, and for the purposes of illustration they are shown of the construction disclosed in the co-pending application, Serial Number 77,579, of Emerson H. Tompkins and Donald L. Spender, filed May 2, 1936, for Flashlights, which application has matured into Patent No. 2,097,222, dated October 26, 1937.

The end wall 21 has a struck up strap 30 beneath which is assembled a fixed conductor 31 with its insulating strips 32 and 33 disposed against the opposite sides thereof. As shown in Figure 10, the conductor 31 has a downwardly offset intermediate portion 34 which extends through a suitably formed opening through the lower insulating strip 32 and also through a larger opening 35 provided in the end wall 21 of the body shell. The offset portion 34 provides an abutment for engaging the terminal of an adjacent battery 23. The upper insulation strip 33 has a substantially centrally disposed depression 36 for receiving therein the depressed portion 37 of the struck up strap 30. The insulating strips 32 and 33 are of a width and thickness to practically fill the space beneath the strap 30 for binding the same beneath the strap, and the depressed portion 37 of the strap engages in the depression 36 to anchor the insulating strips 32 and 33 and the conductor 31 in place. At one end the insulating strips 32 and 33 are increased in width to provide stop shoulders 38 adapted to engage the adjacent edge of the strap 30 and limit the sliding of the insulating strip 32 and 33 and the interposed conductor 31. The strips 32 and 33 are of greater length than the width of the strap 30 so that the strips 32 and 33 bridge the opening beneath the strap and bear upon the upper face of the end wall 21 of the body shell. The insulating strips 32 and 33 and the conductor 31 may be permanently secured to the end wall 21 of the body shell by a rivet 39 which may be secured through all of these elements and the strap 30, the rivet being insulated from the conductor 31.

The combined circuit closing and focusing slide member comprise a separate unit as shown in Figure 8. The slide member is L-shaped with an outer conductor strip 40. One leg of the strip is relatively long and has its lower end reduced in width to provide downwardly facing shoulders 41. The lower reduced end has an opening 42 therein of sufficient diameter to receive therethrough a ball or other pressure device, as later described. In Figure 9 the opening 42a is shown as rectangular in configuration to accommodate a roller 43 as shown in Figure 9a. The lower end of the conductor strip 40 has a V notch 44 therein to facilitate assembling of the slide with the ball in the body casing, and in Figure 9 the lower end of the strip 40 has a beveled edge 44a to cooperate with the roller 43 in the assembling operation.

A lamp socket 45 is secured to the horizontal leg of the conductor strip 40 in electrical connection therewith and extends upwardly therefrom, the strip 40 having an opening therethrough in line with the socket 45 for the reception of the central contact of the lamp. Placed against the inner side of the strip 40 is an insulating strip 46 which preferably extends beyond the upper leg of the conductor strip 40, has an opening in line with the lamp socket 45 and extends a short distance down against the vertical leg of the conductor strip 40. An inner conductor strip 47, placed against the horizontal part of the insulating strip 46 is preferably coextensive with the corresponding portion of the outer strip 40 and may have a socket depression 48 for snugly receiving the central contact of the lamp when in the socket 45. The horizontal portion of the inner conductor strip 47 is spaced inwardly a short distance from the adjacent part of the insulation strip 46 and terminates near the lower end thereof. The spaced depending portion of the conductor strip 47 has a vertical slot 49 therein near its upper end and the metal from the lower end of the slot is bent inwardly to provide an inclined guide or cam 50 leading out of the slot 49. A bottom insulating strip 51 is placed against the inner side of the horizontal leg of the inner conductor strip 47, and all of the strips 40, 46, 47 and 51 are secured together at their upper legs by insulated rivets 52 or the like.

With reference to Figures 1 and 1a, the body shell 20 has an inner housing part formed of a cut and depressed strap 53 which may have its central portion offset outwardly a slight distance to provide lateral channels or grooves 54 in the bottom of the depression formed in the casing. The upper wall 21 of the casing has a slot 55 in line with the depressions at the outer side of the strap 53, and the slide unit or member of Figure 8 is adapted to be positioned with its vertical leg through the slot 55 and with its reduced lower end of the outer conductor 40 passing through the strap 53, shoulders 41 engaging the upper edge of the strap 53 and limiting the downward movement of the slide.

The fixed conductor 31 has one end reduced in width and extending beyond the adjacent insulating strips to provide a contact tongue 31a, and the tongue projects into the slot 49 of the inner conductor strip 47 of the slide member. The tongue 31a closes the circuit when it engages the upper marginal edge of the slot 49 and also when it rides over the cam guide 50 and the lower end portion of the conductor 47.

In Figure 11 the slide control housing 56 is shown, and this part comprises the thumb or finger piece which controls the flash and continuous lighting of the lamp and also controls the focusing of the lamp. The slide control housing 56 is in the form of a relatively flat shell adapted to be placed over the strap depression in the body casing 20 and has end base flanges 57 adapted to conform to and slide over the outer side of the casing 20 toward one end, the shell 56 has a pair of inwardly extending tongues 58 which have their inner ends bent inwardly toward each other and are adapted to be in the channels or grooves 54 of the depression. The tongues 58 embrace the opposite edge portions of the reduced lower end of the outer conductor strip 40 of the slide member and thus lock the slide control housing 56 in sliding engagement against the casing 20. A spring or other depressing member 59 is suitably mounted in the shell 56, as by means of a rivet 60 shown in Figure 1, and is cupped at its outer end to receive a ball 61 for normally urging the same inward toward the strap 53. The inwardly depressed strap 53 of the casing 20 has an opening 62 therein of less size than the opening 42 shown in Figure 8 and conforms substantially in shape thereto, or to the opening 42ª shown in Figure 9 when the roller 43 is used. The flash light is provided with any suitable form of lamp 63 adapted to be inserted in the socket 45 and to extend through the inner end of the reflector 28.

From the above description it will be apparent that this flash light comprises substantially four units; the body shell or casing 20 with its parts, the fixed conductor unit which is snapped beneath the strap 30 of the body shell, the slide member with its spaced conductors 40 and 47 and the lamp socket 45, and the control piece 56 with its parts and which is interlocked with the slide member on the side of the body shell. These units are readily separable for repair, substitution and cleaning, and also admit the rapid assembly of all parts of the flash light and easy access to all parts during assembly.

In operation, the parts are normally in the positions shown in Figure 1. Here the ball 61 is pressed by the spring 59 through the opening 42 of the slide member and into the socket opening 62 of the casing strap 53. The opening 42 through the slide member is so located therein that when the openings 42 and 62 are alined the fixed conductor tongue 31ª is intermediate the slide conductor slot 49 and the circuit closer in the top of the light is open.

At this time the shoulders 41 of the slide member are spaced a slight distance above the body casing strap 53, the slide being held firmly by the pressure of the ball 61 against accidental movement in either position.

Referring to Figure 5, when it is desired to flash the lamp 63 the single control slide 56 is slid backwardly or downwardly into the position shown. When the control slide 56 is moved the ball 61 moves therewith through the spring 59 and the ball engages the edge of the opening 42 in the slide member and shifts the same downwardly with the control slide. The ball rides up out of the depression 62 in the fixed strap 53 but is held against movement beyond the edge of the depression by the shoulders 41 engaging the body casing strap 53 so that immediately upon release of the control slide 56 the ball 61 is forced back into the depressions 62 and the control slide and the slide member are returned automatically to their normal circuit open position. When the slide member is thus shifted momentarily downward, the circuit is closed by the contact tongue 31ª engaging the upper edge of the slot 49, the circuit being completed through the socket 45 and its lamp 63 and through the outer conductor 40 of the slide member in frictional contact with the body shell 20. The body shell or casing 20 is in electrical contact with one side of the battery and the fixed conductor 31 with its tongue 31ª is in contact with the other side of the battery. With reference to Figure 6, the parts are shown in position to maintain the circuit closed and effect a constant light. The control slide 56 is moved into upward position to raise the ball 61 out of the depression 62 and to move the ball 61 along the flat face of the strap 53 so that the ball, under pressure of the spring 59 is frictionally held from moving and thus holds the control slide 56 in its adjusted position. The control slide 56 also moves therewith the slide member as the ball rides in the opening 42 thereof so that the slide member may be moved by the control slide into various positions of longitudinal adjustment to adjust the focus of the lamp 63 in the reflector.

When the control member 56 moves the slide member upwardly the cam guide 50 engages the fixed contact tongue 31ª and closes the circuit through the lamp. Further upward movement of the slide member causes the cam guide 50 to direct the tongue 31ª on to the lower end of the inner conductor strip 47 of the slide member to maintain the circuit closed and admit of the focal adjustment of the lamp carried by the slide member. Various focal adjustments of the lamp in the reflector may thus be made within the range of the upward movement of the control slide 56.

The head shell 25 with its parts including the reflector 28 may be turned on the casing by virtue of its threaded mounting thereon to correct any focal position within the upper range of the control slide 56.

The modified construction shown in Figures 12 to 15 has the parts and units permanently secured in assembled relation and does not provide for the focal adjustment of the lamp in the reflector except through the screwing adjustment of the head shell.

The body shell or casing 20 is of the same construction as in the form shown in Figure 1 with the exception that the depressed side strap 53 has not only the neutral slide control opening 62 but also has a second opening 64 spaced above the opening 62 to determine and hold the slide in circuit maintaining position. The upper end wall 21ª of the body casing does not have the struck up strap of Figure 1 but instead has a central opening 65 for receiving the offset battery abutment 34 of the conductor strip 31.

The wall 21ª of the casing carries on its outer side the circuit closing means at a point remote from the batteries and the control slide. The outer conductor strip 40ª which carries the socket 45 for the lamp 63 is supported on strip 46ª which in turn covers the inner conductor strip 47ª. An insulating strip 33ª lies beneath the inner conductor strip 47ª and above the conductor strip 31 which is supported on the bottom insulation strip 32ª having an aperture for the battery abutment 34. All of these superposed conductor and insulating strips are secured together and to the end wall 21ª of the casing by the insulating rivets 52ª, the same also serving as electrical conductors between the top strip 40ª and the end wall 21ª of the casing.

The circuit closing is effected between the inner conductor strip 47ª and the lower conductor strip 31, the latter having an elongated resilient spring tongue 31ᵇ for flexing in opposite directions to close the circuit. The adjacent insulating strips 33ª and 32ª are beveled or recessed to admit for flexing of the tongue 31ᵇ.

The ends of the conductor strips 40ª and 47ª and the interposed insulating strip 46ª are directed downwardly at one side of the structure and the inner conductor strip 47ª has a vertical slots 49 therein into which the free end of the tongue 31ᵇ projects. The cam guide 50ª is struck inwardly from the upper end of the slot 49 for engaging the tongue 31ᵇ and directing the same over the flat face of the conductor strip 47ª above the slot 49.

The flexing of the tongue 31ᵇ and the closing of the circuit is effected by a slide member 66 similar to the lower end of the conductor strip 40 of Figure 8 but with exception that at least the upper end thereof is of insulating material.

The upper end or head 67 of the slide member is of insulating material and has a vertical slot 68 through which the tongue 31b projects. The head 67 is disposed against the inner side of the depending end of the conductor strip 47a and when shifted engages and flexes the tongue 31a into electrical contact with the conductor strip 47a at opposite ends of the slot 49 thereof.

In Figure 14 the slide member 66 is shown as of insulating material throughout its length, but as shown in Figure 15 the body 66a of the slide member may be of metal or other material and the head 67a at least is of insulating material.

The lower end of the slide member 66 engages through the strap 53 of the body casing 20 and within the tongues 58 of the control slide 56 to interlock the same with the casing. The ball 61 of the control slide normally rests in the opening 62 of the casing strap 53, and in this position holds slide member 66, as shown in Figure 12, with the upper edge of the slot 68 spaced a short distance above the tongue 31b. Slight downward movement of the control slide 56 raises the ball 61 out of the opening 62, as in the other form shown in Figure 5, and the shoulders 41 limit the movement of the ball beyond the edge of the opening so that the spring pressure on the ball 61 automatically returns the ball to neutral position. This slight downward movement of the control slide 56 brings the tongue 31b down against the lower edge of the slot 49 in the conductor strip 47a and closes the circuit. Intermittent downward movement of the control slide 56 thus effects the flashing of the lamp.

When the control slide 56 is moved upward the ball 61 leaves the opening 62 and rides over the strap 53 and into the upper opening 64, carrying therewith the slide member 66. The lower edge of the slot 68 of the slide member moves upward and engages the tongue 31b and carries it against and over the cam guide 50a to close the circuit and the ball 61 in the upper opening 64 maintains the circuit closed.

As shown in Figure 12, the spring 59a may be secured in the control slide shell 56 by a returned back portion 59b which is seated in the bottom of the shell 56 and may be used in place of the rivet 60 in the form of Figure 5.

The fixed conductor unit may be easily assembled beneath the strap 30 by first placing the insulator strip 32 against the bottom of the conductor strip 31 with the abutment 34 projecting through the rectangular opening in the insulator strip to hold the strip from relative turning and edgewise displacement. These two interfitting strips 31 and 32 are now slid under the strap 30 into position bridging the opening 35 and their correct position is determined by the engagement of the shoulders or projections 38 against the edge of the strap 30. The insulator strip 33 is now slid beneath the strap 30 and over the upper side of the conductor strip 31 until its projections 38 also engage the edge of the strap 30, at which time the depression in the strip 33 registers with the depressed portion of the strap 30 and the strips are thus firmly held in position beneath the strap. These strips may be permanently secured together, if desired, by the rivet 39 as shown in Figure 1.

It is obvious that various changes and modifications may be made in the details of construction and design of the above specifically described embodiment of this invention without departing from the spirit thereof, such changes and modifications being restricted only by the scope of the following claims.

What is claimed is:

1. In a hand flash light, a body shell, lamp socket supporting and circuit closing means on the outer end of the shell and including contacts relatively movable a short distance in one direction to close the circuit and relatively movable a greater distance in the opposite direction to close the circuit, and also including a connecting element for selectively closing the contacts and extending lengthwise of the shell, and a single control slide mounted on the outer side of the shell remote from the circuit closing means and releasably locked to said connecting element for assembly and removal, said single control slide adapted to be slid a short distance along the casing in one direction to relatively move the contacts into circuit closing position for flashing a lamp in the said socket and adapted to be slid a greater distance in an opposite direction for relatively moving the contacts to maintain the circuit closed.

2. In a hand flash light, a body shell having an end wall, a fixed insulated contact mounted on the outer side of the wall and having its central portion offset through the wall for engaging the central electrode of a battery, a movable member disposed outwardly of the fixed contact and having a lamp socket, and a movable contact with engaging portions spaced from the opposite sides and in the path of the fixed contact and having a circuit completing portion extending lengthwise in contact with the body shell, and a single control slide mounted exteriorly on the shell and connected to said circuit completing portion for moving the member and being biased to a neutral position from one direction sliding movement to normally maintain the circuit open and adapted to be intermittently slid in said direction for flashing a lamp in said socket, said control slide adapted to be slid in the opposite direction for moving and frictionally maintaining the movable member in contact closing position to maintain the lamp lighted.

3. In a hand flash light, a body shell having an end wall, a fixed insulated contact secured on the outer side of the wall and having an offset central portion projecting through the wall for engaging a battery, a movable contact member having a contact disposed in the path of said fixed contact for engaging the same when the member is moved in either direction and having a connecting portion extending lengthwise in the casing, and a single control slide mounted on the outer side of the shell and releasably locked to the connecting portion of said member for assembly and removal, said slide adapted for movement in either direction to shift the movable member and close the contacts and light the flash light.

4. In a hand flash light, a body shell having an end wall and a reflector beyond the said wall, a fixed insulated contact secured on the outer side of the end wall, a movable member disposed outwardly of the fixed contact and having a lamp socket for a lamp adapted to project into the reflector, said member having a movable contact thereon lying in the path of the fixed contact for engaging the same upon movement of the member in either direction toward and from the reflector and the member further having an extension disposed lengthwise of the shell, and a single control slide mounted against the outer side of the shell and connected to said extension of the movable member for moving the same, said control slide being biased from one direction movement into a normal neutral position with the contacts separated for automatically opening the contacts when the control slide is released from said one direction movement and adapted for movement in an opposite direction for shifting the movable member to close the contacts and change the focal adjustment of the lamp in the reflector.

5. In a hand flash light having a reflector, a movable member disposed behind the reflector and having a socket for a lamp adapted to project into the reflector, said member also having means for closing a circuit through the lamp when the member is moved, a single control member mounted for sliding movement in opposite directions at the side of the flash light and connected to the movable member for closing the circuit and adjusting the focus of the lamp in the reflector by the sliding of the control member in one direction and for closing the circuit when moved in the opposite direction, said control member being biased to return sliding movement from movement in said opposite direction, and means for limiting sliding movement of the control member in said opposite direction for flashing the lamp.

6. In a hand flash light, having a casing with an inwardly struck strap in one side, a control slide fitted to the outer side of the casing and having inturned tongues projecting into the casing toward the strap, a movable member in the casing having a strip portion extending through said strap and through said inturned tongues to slidably lock the control slide to the casing, a spring pressed ball carried in the control slide and projecting through said strip portion of the movable member for holding the latter for movement with the control slide, said casing strap having a recess therein disposed to receive the inner side of the ball when the control slide is in one position to yieldingly hold it in said position, said strip portion having stop shoulders to engage the edge of the casing strap for limiting the movement of the control slide in one direction.

7. In a hand flash light, a casing having an opening in one side with a spaced strap at the inner side of the opening, a control slide fitting over said opening and having an interlocking portion at its inner side, a movable member having a strip portion for engagement through the strap in the casing and with said interlocking portion of the control slide, said strip portion having an opening therein and said strap having a recess to register with the opening when the strip is in a predetermined position, and a spring pressed ball in the control slide engaging in the opening to hold the strip for movement with the control slide and adapted to engage through the strap and into said recess to yieldingly hold the strip and control slide in said position.

8. In a hand flash light, a casing, a control slide slidably disposed at the outer side of the casing, a movable member having a connecting strip in the casing with a portion interlocked through the wall of the casing with said control slide to hold the latter to the casing, and yieldable means between the casing wall and the control slide and engaging the connecting strip to hold the latter for movement with the control slide for yieldingly holding both the strip and slide in adjusted position.

9. In a hand flash light, a casing having an end wall with a strap struck upwardly therefrom and provided with a central depressed locking portion in the strap, a fixed conductor strip having a downwardly offset portion extending through said wall for contact with a battery terminal, and insulating strips disposed at opposite sides of the conductor strip between the same and said wall and said strap, the upper insulating strip having a central depression therein extending into the offset portion of the conductor strip, said depressed locking portion of the strap interfitting the depressed portion of the upper insulating strip to interlock all of the strips beneath the strap.

10. In a hand flash light, a casing having an end wall with a strap extending there-across, a conductor strip having a portion exposed to the underside of said end wall, insulating elements disposed at opposite sides of the conductor strip between the same and said end wall and the strap, said conductor strip having a contact portion, a movable member having spaced conductor elements adapted for connection with a lamp, one of said conductor elements disposed for engagement with said contact portion of the conductor strip.

11. In a hand flash light, a casing having an end wall, a conductor strip having a portion exposed to the underside of said end wall, insulating elements disposed at opposite sides of the conductor strip with one element between the same and the end wall, said conductor strip having a contact portion, insulatingly spaced conductor elements adapted for connection with a lamp and with one of the conductor elements disposed for engagement with said contact portion of the conductor strip, and means for relatively moving the said conductor element and strip into open and closed positions.

12. In a hand flashlight, a casing having an end wall with a strap extending there-across, a conductor strip having a portion exposed to the underside of said end wall, insulating elements slidably disposed beneath the strap at opposite sides of the conductor strip between the same and said end wall and the strap, and stop means for the insulating elements to determine the limit of their sliding positions beneath the strap.

13. In a hand flashlight, a casing, a fixed contact mounted on the end of the casing and slidably removable in one direction transversely of the casing, a slide member having a movable contact for cooperation with the fixed contact and having a connecting portion extending lengthwise in the casing in line with the outer end of the fixed contact to maintain the same from withdrawal from the end of the casing, a control slide at the outer side of the casing, said connecting portion of the slide member having a releasable interlocking connection with the control slide.

14. In a flashlight, a casing having a reflector, a lamp carrying slide removably disposed in the casing for supporting a lamp in the reflector, and a shiftable thumb piece disposed against the outer side of the casing, said slide and said thumb piece having interlocking parts connecting the same through the casing to adjust the slide by movement of the thumb piece and to hold the slide and thumb piece in their relative positions on the casing, said interlocking parts adapted to be released for removal of the slide and thumb piece from the casing.

15. Control means for a flashlight having a casing, comprising a control slide within the casing, and a thumb piece movable at the outer side of the casing, said slide and thumb piece having spring interlocked parts connecting the same through the casing to adjust the control slide by movement of the thumb piece and to releasably hold the slide and thumb piece in their relative positions, said interlocking parts adapted to be released from each other by pressure sufficient to overcome the spring interlocking thereof for removal of the slide and thumb piece from the casing.

16. In a flashlight, a casing having an end wall with a strap struck and offset therefrom providing an opening through the wall beneath the strap, an insulating plate slidably fitting beneath the strap across the opening in the wall and having a central relatively small opening of less dimensions than the opening in the end wall, a contact strip fitting beneath the strap over the insulating plate and having an intermediate offset portion projecting through the small opening in the insulating plate and in spaced relation to the marginal edge of the opening in the end wall, said contact strip having one end projecting beyond the insulating plate to provide a fixed contact, a second insulating plate fitted beneath the strap and over the contact strip and the first insulating plate, said insulating plates and contact strip frictionally engaging between the end wall and the strap thereof, and a movable contact on the casing for adjustment into and out of engagement with the projecting contact end of the strip.

ALBERT J. SCHOLTES.